(12) United States Patent
Carolan et al.

(10) Patent No.: US 7,058,022 B1
(45) Date of Patent: Jun. 6, 2006

(54) METHOD FOR MANAGING ACCESS TO NETWORKS BY EMPLOYING CLIENT SOFTWARE AND A CONFIGURATION PROTOCOL TIMEOUT

(75) Inventors: Sean E. Carolan, Freehold, NJ (US); Brian D. Freeman, Farmingdale, NJ (US); Paul A. Sherman, Freehold, NJ (US)

(73) Assignee: AT&T Corp., New York, NY (US)

( * ) Notice: Subject to any disclaimer, the term of this patent is extended or adjusted under 35 U.S.C. 154(b) by 844 days.

(21) Appl. No.: 09/984,987

(22) Filed: Oct. 31, 2001

Related U.S. Application Data

(63) Continuation-in-part of application No. 09/812,315, filed on Mar. 20, 2001.

(51) Int. Cl.
*H04L 12/28* (2006.01)
*G06F 15/16* (2006.01)

(52) U.S. Cl. .............. 370/254; 370/401; 709/218; 709/220; 709/250

(58) Field of Classification Search ........... 370/252, 370/389, 400, 401, 411, 475; 709/217–219, 709/220, 221, 225, 250
See application file for complete search history.

(56) References Cited

U.S. PATENT DOCUMENTS

| | | | | |
|---|---|---|---|---|
| 5,539,815 A | * | 7/1996 | Samba | 379/221.07 |
| 5,790,548 A | * | 8/1998 | Sistanizadeh et al. | 370/401 |
| 5,884,024 A | * | 3/1999 | Lim et al. | 713/201 |
| 5,898,780 A | | 4/1999 | Liu et al. | |
| 5,898,839 A | | 4/1999 | Berteau | |
| 6,073,178 A | * | 6/2000 | Wong et al. | 709/229 |
| 6,145,002 A | | 11/2000 | Srinivasan | |
| 6,205,479 B1 | | 3/2001 | Dulai et al. | |
| 6,212,561 B1 | * | 4/2001 | Sitaraman et al. | 709/225 |
| 6,243,754 B1 | | 6/2001 | Guerin et al. | |
| 6,286,049 B1 | | 9/2001 | Rajakarunanayake et al. | |
| 6,424,654 B1 | * | 7/2002 | Daizo | 370/401 |
| 6,636,502 B1 | * | 10/2003 | Lager et al. | 370/352 |
| 6,657,991 B1 | * | 12/2003 | Akgun et al. | 370/352 |
| 6,678,732 B1 | * | 1/2004 | Mouko et al. | 709/227 |
| 6,697,864 B1 | * | 2/2004 | Demirtjis et al. | 709/229 |
| 6,748,439 B1 | * | 6/2004 | Monachello et al. | 709/229 |
| 6,895,511 B1 | * | 5/2005 | Borsato et al. | 713/201 |
| 2001/0007996 A1 | | 7/2001 | Dulai et al. | |

OTHER PUBLICATIONS

"Internet Protocol," IETF Network Working Group, RFC 791 (Sep. 1981).

(Continued)

*Primary Examiner*—John Pezzlo
*Assistant Examiner*—Brian Roberts

(57) ABSTRACT

A method of configuring a network access device having a network address associated with an extra-regional service provider with a new network address associated with a regional access network provider, where the network access device is connected to a regional access network connected to a plurality of extra-regional service networks. The method includes receiving a request from the network access device requesting the release of access to the extra-regional service network, sending a response from the regional access network, and receiving a network address change request using a configuration protocol. In another aspect of the invention, the network address associated with an extra-regional service provider is automatically released when a regional access network server fails to receive a request to renew the network address lease, and a new network address associated with the regional access network is assigned to the network access device.

24 Claims, 8 Drawing Sheets

OTHER PUBLICATIONS

Deering et al, Internet Protocol, IETF Working Group, RFC 1883 (Dec. 1995).

Data-Over-Cable Service Interface Specifications: Cable Modem Termination System—Network Side Interface Specification, Cable Television Laboratories, Inc., SP-CMTS-NSI-I01-960702.

Data-Over-Cable Service Interface Specifications: Cable Modem to Customer Premise Equipment Interface Specification, Cable Television Laboratories, Inc., SP-CMCI-C02C-991015.

Society of Cable Telecommunications Engineers, Inc., Engineering Committee Data Standards Subcommittee, SCTE 21-2 2001, "Baseline Privacy Plus Interface Specification," /SP-BPI+-106-001215.

Droms, Dynamic Host Configuration Protocol, IETF Network Working Group, RFC 2131 (Mar. 1997).

Alexander et al, DHCP Options and BOOTP Vendor Extensions, IETF Network Working Group, RFC 2132 (Mar. 1997).

Droms et al, Authentication for DHCP Messages, IETF Network Working Group, Internet Draft, <draft-ietf-dhc-authentication-16.txt>.

Hornstein et al, "DHCP Authentication via Kerberos V", IETF Network Working Group, Internet Draft, <draft-hornstein-dhc-kerbauth-06.txt>.

Rigney et al, "Remote Authentication Dial in Subscriber Service (RADIUS)," IETF Network Working Group, RFC 2058 (Jan. 1997).

* cited by examiner

METHOD FOR MANAGING ACCESS TO NETWORKS BY EMPLOYING CLIENT SOFTWARE AND A CONFIGURATION PROTOCOL TIMEOUT

This application is a continuation-in-part of U.S. application Ser. No. 09/812,315, entitled "METHOD AND APPARATUS FOR COORDINATING A CHANGE IN SERVICE PROVIDER BETWEEN A CLIENT AND A SERVER," filed on Mar. 20, 2001, and is filed concurrently with U.S. application Ser. No. 09/984,958 entitled "METHOD FOR ISP CHOICE SERVICE ACTIVATION FOR BROADBAND ACCESS PROVIDERS," the contents of which are both incorporated by reference herein.

FIELD OF THE INVENTION

The present invention relates generally to communication network services, and, more particularly, to a method for enabling a client to change between an extra-regional service network and a regional access network in a broadband communications network.

BACKGROUND OF THE INVENTION

Customers of communication network services often desire access to a plurality of different services and different service providers. For example, when using a dial-up connection to a packet-switched data network such as the Internet, a customer can choose from multiple service providers by dialing different telephone numbers in the PSTN. The physical path from the customer to the customer's Internet Service Provider (ISP) is dedicated to the connection for the duration of the telephone call. The ISP assigns an IP address to the customer and can link the authenticated customer and the assigned IP address to the physical address (e.g. dial-up modem) used by the customer. With this linkage, the ISP can ensure the customer only uses the address authorized by the ISP and can use the customer's IP address to manage access to the ISP's services. Both the physical connection between a customer and the ISP, and the linkage to IP address assignment and customer authentication are terminated when the dial-up connection is terminated.

Constrained by the physical capacity of these temporary connections across the PSTN, many service providers are moving to high-speed access architectures (e.g., digital subscriber line (DSL), wireless, satellite, or cable) that provide dedicated physical connectivity directly to the subscriber and under the control of the ISP. These alternatives to shared access through the switched telephone network, however, do not lend themselves to shared access by multiple services and/or service providers.

BRIEF SUMMARY OF THE INVENTION

The present invention provides in an illustrative embodiment, a method of configuring a network access device having an extra-regional network address allocated to a subscriber of services of an extra-regional service provider provided by an extra-regional service network, with a new network address allocated to a subscriber of services of a regional access network service provider provided by an access network, wherein the network access device is connected to a regional access network connected to a plurality of service networks. The method comprises the steps of: sending a request from the regional network access device to the access network requesting a change to the regional access network provider; receiving a response from the access network; and initiating a network address change request using a configuration protocol. In this manner, a regional network address allocated to the subscriber of services of the regional access service provider is assigned to the network access device to enable the network access device to communicate data packets to the regional access network providing the selected service.

In another preferred embodiment, a default change from service access to an extra-regional service network to the regional access network alone is exercised relative to a configuration protocol timeout. According to this embodiment, a client fails to send a heartbeat message prior to a pre-set authenticate-until time period. When this occurs, the service activation system fails to grant renewal of the lease of an extra-regional network address when requested of the configuration server. The network access device is therefore assigned a new network address associated with the regional access network. In another aspect of the invention, the change from extra-regional service network access to regional access network access is occasioned by a client request to log off the extra-regional service network and change to regional only access.

These and other advantages of the invention will be apparent to those of ordinary skill in the art by reference to the following detailed description and the accompanying drawings.

BRIEF DESCRIPTION OF THE DRAWINGS

A more complete understanding of the present invention and the advantages thereof may be acquired by referring to the following description in consideration of the accompanying drawings, in which like reference numbers indicate like features and wherein.

DETAILED DESCRIPTION OF THE INVENTION

Figure 1:
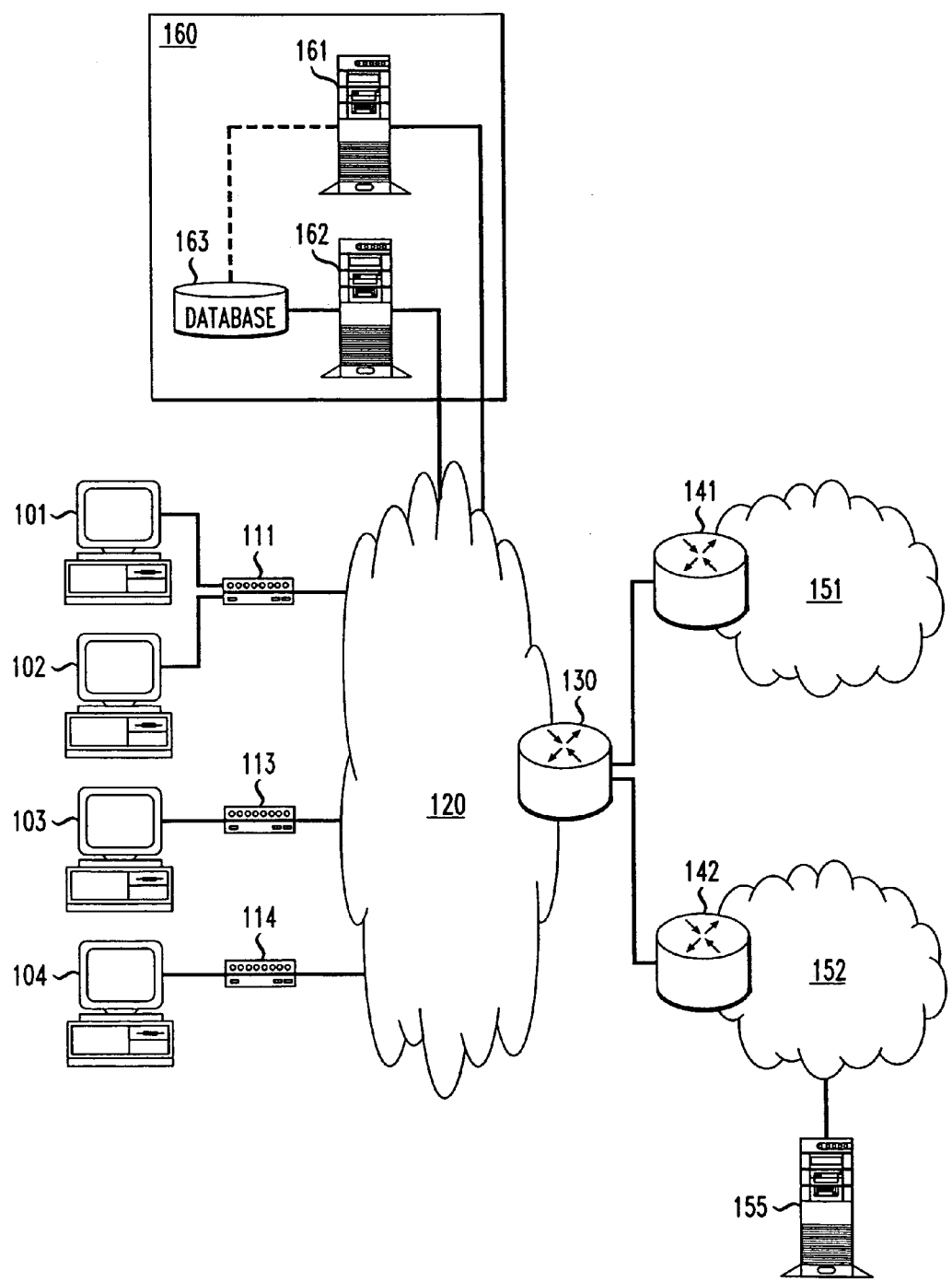
FIG. 1 illustrates an interconnection of packet-switched extra-regional service networks and a regional access network embodying principles of the invention.

In FIG. 1, a plurality of subscribers operating network access devices 101, 102, 103, . . . 104 are provided access to communication network services, which are facilitated by a plurality of extra-regional packet-switched data networks, shown in FIG. 1 as 151 and 152, and a regional access network 120. Packet-switched data networks, such as extra-regional service networks 151 and 152 and regional access network 120, which are generally referred to herein as "service networks," offer access to different services and/or are operated by different service providers. For example, extra-regional service network 151 could provide packet-switched connectivity to public data networks while extra-regional service network 152 could offer packet-switched telephony service (or the same public data network connectivity, but from a different service provider), and regional access network 120 could provide packet-switched connectivity to public data networks within the geographical region. The service networks, as is well known in the art, utilize a network addressing scheme to route datagrams to and from hosts: for example, where the service networks utilize the TCP/IP protocol suite, Internet Protocol (IP) addresses are assigned to each host and utilized in the process of routing packets from a source to a destination in the networks. See, e.g., "INTERNET PROTOCOL," IETF Network Working Group, RFC 791 (September 1981); S. Deering, R. Hinden, "Internet Protocol, Version 6 (IPv6) Specification," IETF Network Working Group, RFC 1883 (December 1995), which are incorporated by reference herein. The invention shall be described herein with particular reference to the TCP/IP protocol suite and IP addresses, although those skilled in the art would readily be able to implement the invention using any of a number of different communication protocols.

The network access devices 101 . . . 104 are typically customer premises equipment (CPE) such as a personal computer, information appliance, personal data assistant, data-enabled wireless handset, or any other type of device capable of accessing information through a packet-switched data network. Each network access device 101 . . . 104 is either connected to or integrated with a network interface unit 111 . . . 114, e.g. a modem, which enables communication through a regional access network infrastructure, shown as 120 in FIG. 1. Each network access device is assigned an IP address, which, in accordance with an aspect of the invention, is associated with a particular service or service provider to which the user of the device is subscribed. For example, network access device 101 is assumed to have been assigned, for purposes of the description herein, an IP address associated with an extra-regional service provider operating service network 151. As further described herein, it is advantageous to provide a service activation system 160 which advantageously permits the dynamic allocation, assignment, and reassignment of IP addresses to the plurality of network access devices based on customer subscriptions to particular services.

The network access device 101 communicates with the extra-regional service network 151 through the regional access network infrastructure 120, which, in accordance with aspects of the invention, is capable of recognizing and directing traffic to the proper extra-regional service network or within the regional access network. The regional access network infrastructure 120 advantageously can be operated and maintained by an entity that is the same as or different from the entities operating and maintaining the extra-regional service networks 151 and 152. In accordance with an embodiment of an aspect of the present invention, the different IP-based services offered by the different extra-regional service networks 151 and 152 utilize shared layer one and layer two resources in the regional access network 120. Layer three routing procedures, however, are modified to permit IP traffic from network access device 101 to flow to the correct subscribed extra-regional service network 151. The regional access network 120 has a router 130 on the edge of the regional access network. The router 130 has a first interface with a connection to a router 141 in extra-regional service network 151 and a second interface with a connection to a router 142 in extra-regional service network 152. As further described herein, the router processes packets and is capable of directing traffic to the proper service network.

Figure 2A:
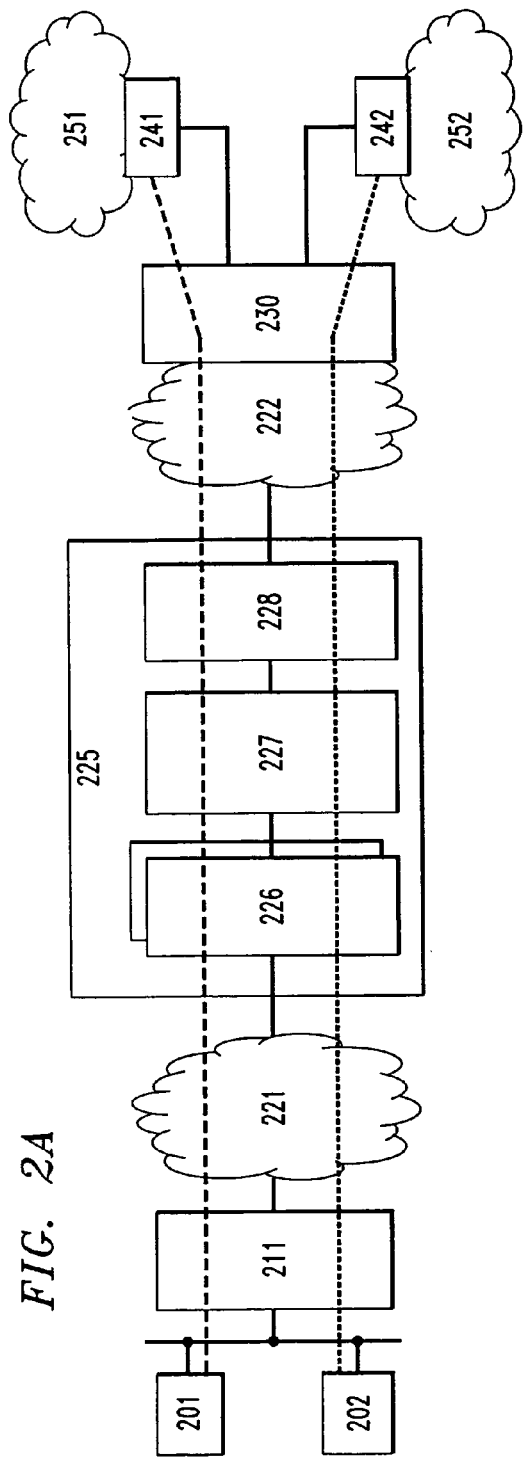
FIG. 2A and FIG. 2B is conceptual representation of an exemplary embodiment illustrating principles of the invention based on an HFC access architecture with corresponding end-to-end protocol layers.
Figure 2B:
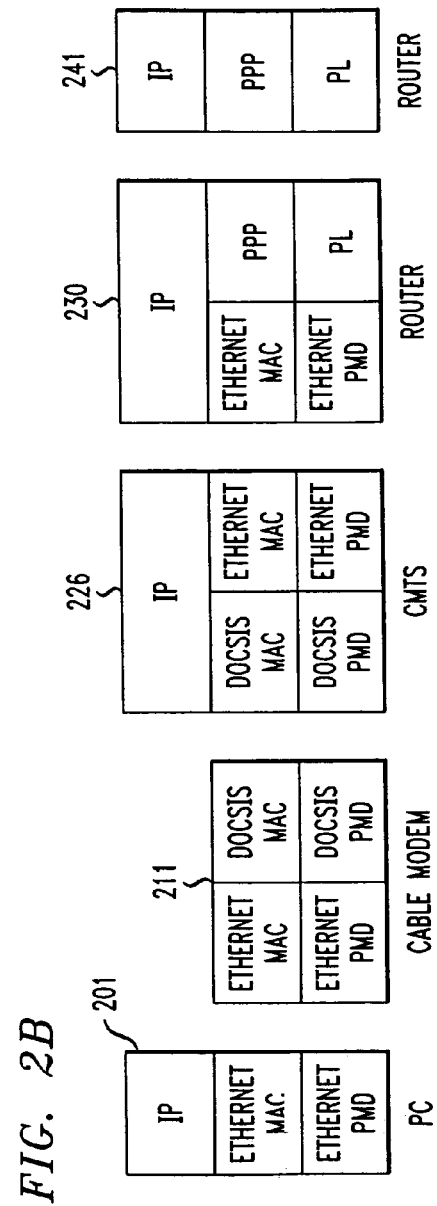

FIG. 2A shows an exemplary access architecture based on a hybrid fiber coaxial (HFC) access network. As is known in the art, each network interface device 201 . . . 202 is either connected to or integrated with a cable modem 211 which enables communication through the HFC network 221. In accordance with the Data Over Cable Service Interface Specification (DOCSIS), a Cable Modem Termination System (CMTS), shown as 225 in FIG. 2A, communicates with the cable modems 211 and manages access to both upstream and downstream cable capacity on the HFC networks 221. See, e.g., "Data-Over-Cable Service Interface Specifications: Cable Modem Termination System—Network Side Interface Specification," Cable Television Laboratories, Inc., SP-CMTS-NSI-I01-960702; "Data-Over-Cable Service Interface Specifications: Cable Modem to Customer Premise Equipment Interface Specification," Cable Television Laboratories, Inc., SP-CMCI—C02C-991015; "Data-Over-Cable Service Interface Specifications: Baseline Privacy Plus Interface Specifications," Cable Television Laboratories, Inc., SP-BPI+-I06-001215, which are incorporated by reference herein. The CMTS 225 manages the scheduling of both upstream and downstream transmission and allocates cable capacity to individual customers identified by a Service IDs (SIDs). The CMTS 225 can have an integrated router 228 or can be a separate device 226 that bridges to a switch 227 which connects to the router 228. The IP router 228 provides connectivity to a regional IP network 222, which further comprises the router 230 (corresponding to router 130 in FIG. 1) which interfaces to IP routers 241 and 242 in extra-regional service networks 251 and 252, respectively. Accordingly, the HFC network 221, the CMTS 225, and the IP network 222 correspond to the regional access network infrastructure 120 shown in FIG. 1. FIG. 2B shows a conceptual diagram of the end-to-end communication protocol stack from a network access device 201 (101) to a router 241 (141) in extra-regional service provider's network 251 (151). As is known in the art, the lowest layer deals with the physical layer (PL) of the protocol stack, e.g. the Ethernet physical media device (PMD) layer; the second layer deals with the data link layer, e.g. the Ethernet Media Access Control (MAC) layer; which the third layer in the protocol stack deals with the network layer, e.g. the IP layer.

Router 130 in the access network 120 in FIG. 1 (corresponding to IP router 230 in FIG. 2) separates the IP traffic to the multiple extra-regional services or service providers as well as combines traffic from the multiple extra-regional service or service providers, whereas router 128 separates the IP traffic to addresses within the regional access network and to router 130 for extra-regional addresses as well as combines regional IP traffic and traffic from router 130. In accordance with an aspect of the invention, IP packets are routed from network access device 101 to the subscribed extra-regional service network 151 using source address-based policy routing. Conventional routing is destination-based: the router consults an internal routing table which maps the destination addresses of all inbound packets to a physical interface address for use for outgoing packets. Policy routing schemes, however, will selectively choose different paths for different packets even where the packet's destination address may be the same.

Because network access devices are assigned addresses associated with a particular network service provider, the source address based policy routing scheme ensures packets from a network access device will go to the appropriate service network. This system of routing works even for traffic within the regional access network, because packets with source addresses matching the service network, such as the regional access network, are routed through conventional destination-based routing. Generally, to route messages to addresses outside the regional access network, the router receives an incoming packet, reads the packet header and retrieves the packet filtering rules, typically stored in an access list. The router then applies the packet filtering rules, and compares the source IP address in the packet header to a list of addresses allocated to subscribers to a first service provider, e.g. operating service network 151 in FIG. 1. If the source address matches one of these addresses, then the router forwards the packet to a router in service network 151, e.g. router 141 in FIG. 1. The router compares the source IP address in the packet header to a list of addresses allocated to subscribers of a second service provider, e.g. operating service network 152 in FIG. 1. If the source IP address matches one of these addresses, then the router forwards the packet to a router in extra-regional service network 152, e.g. router 142 in FIG. 1. The router continues in this fashion with any other packet filtering rules identifying IP addresses allocated to subscribers of any other service providers. Assuming the IP source address does not match any such addresses associated with a service provider, the router applies any remaining packet filtering rules and routes or denies the packet accordingly.

The network access device (or "client") 101 includes, in an exemplary embodiment as a personal computer (PC), a processing unit, memory, and a bus that interfaces the memory with the processing unit. The computer memory includes conventional read only memory (ROM) and random access memory (RAM). An input/output system (BIOS) contains the basic routines that help to transfer information between elements within the network access device 101 such as, for example, during start up. These are stored in the ROM. The network access device 101 may further include a hard disk drive, a magnetic disk (e.g., floppy disk) drive, and an optical disk drive (e.g., CD-ROM) in a conventional arrangement. The hard disk drive, magnetic disk drive and optical disk drive are coupled to the bus by suitable respective interfaces. The drives and associated computer-readable media provide nonvolatile storage for the network access device 101. The network interface unit 111 (211) as depicted in FIGS. 1 and 2 is coupled to an appropriate network interface communicating with the system bus.

Client software residing in the computer memory associated with any particular network access device 101 . . . 104 may provide a user interface for accessing several different communication network services at different times and in different browsing sessions. For example, browser software running on network access device 101 (FIG. 1) may serve as a user interface for accessing both service network 151 and service network 152.

Figure 3:
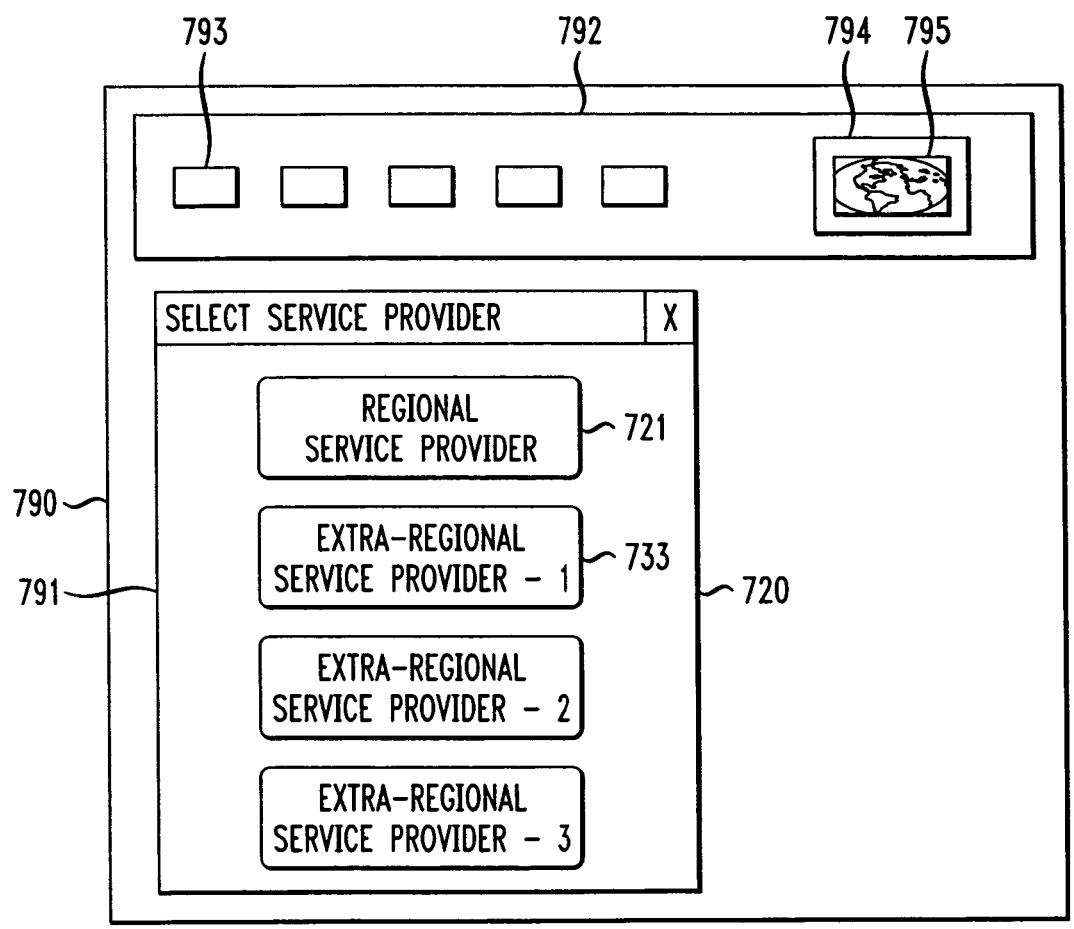
FIG. 3 is a diagram of a browser user interface showing the service provider manager function of the client software.

An illustrative browser user interface 790 generated by software running on the client is depicted in FIG. 3. The browser user interface 790 includes an HTML display area 791, and a windows-type border area including a function bar 792 having a plurality of buttons 793. A branding region 794 is provided in the border area for displaying brand indicia 795 as described in copending application entitled "Method and Apparatus for Dynamically Displaying Brand Information In a User Interface," assigned to a common assignee and filed concurrently herewith. The branding region may be located in the border 792 as shown, or may be located elsewhere in the border area of the browser. The brand indicia 795 displayed in the branding region 794 consists of information retrieved by the network access device from a branding data server (not shown).

The browser user interface 790 provides a graphical user interface (GUI) and includes a service provider manager function or module that enables the user to switch between service providers (e.g., associated with networks 120, 151, 152). The service provider manager function is enabled by selecting the appropriate button or control on the menu bar 792. This may be explicitly presented on a particular button 793 or such function can be part of a selection on a drop-down menu. The service provider management function of the client software permits the user to select a service provider from a list of subscribed service providers, including the subscriber of the regional access network. In the embodiment depicted in FIG. 3, the service provider manager function has been selected by the user and a window 720 is generated that contains a plurality of choices, e.g., REGIONAL SERVICE PROVIDER, EXTRA-REGIONAL SERVICE PROVIDER-1, EXTRA-REGIONAL SERVICE PROVIDER-2, and EXTRA-REGIONAL SERVICE PROVIDER-3 (hereinafter described as r-svc, x-svc-1, x-svc-2, etc). User credentials for each service provider may be cached within the client memory. The service provider manager can also offer to add new service providers in accordance with the user's selection, and update information may be downloaded as is well known in the art. As described herein, a subscriber to x-svc-1 has an IP address currently allocated to svc-1, and desires to change to r-svc. The process for effectuating this change will be described in more detail below.

It is advantageous to enable the IP addresses-which ultimately determine the service network utilized by the particular network access device to be allocated and reassigned dynamically. With reference to FIG. 1, a service activation system 160 is shown which further comprises a configuration server 161 and a registration server 162 connected to the regional access network infrastructure 120. The registration server 162 provides a network-based subscription/authorization process for the various services shared on the access network infrastructure 120. A customer desiring to subscribe to a new service can access and provide registration information to the registration server 162, e.g. by using HTML forms and the Hyper Text Transfer Protocol (HTTP) as is known in the art. Upon successful service subscription, the registration server 162 updates a database 163 which associates the customer information including the customer's hardware address (e.g., the MAC address of the network access device 101) with the subscribed service.

The configuration server 161 uses the registration information to activate the service. The configuration server 161 is responsible for allocating network addresses on behalf of the service networks from a network address space associated with the selected service. In a preferred embodiment of this aspect of the invention, the configuration server 161 uses a host configuration protocol such as the Dynamic Host Configuration Protocol (DHCP) to configure the network addresses of the network access devices. See R. Droms, "Dynamic Host Configuration Protocol," IETF Network Working Group, RFC 2131 (March 1997); S. Alexander, R. Droms, "DHCP Options and BOOTP Vendor Extensions," IETF Network Working Group, RFC 2132 (March 1997); which are incorporated by reference herein. This aspect of the invention shall be described herein with particular reference to DHCP, and the configuration server 161 shall be referred to herein as the DHCP server, although those skilled in the art would readily be able to implement this aspect of the invention using a different protocol.

Figure 4:
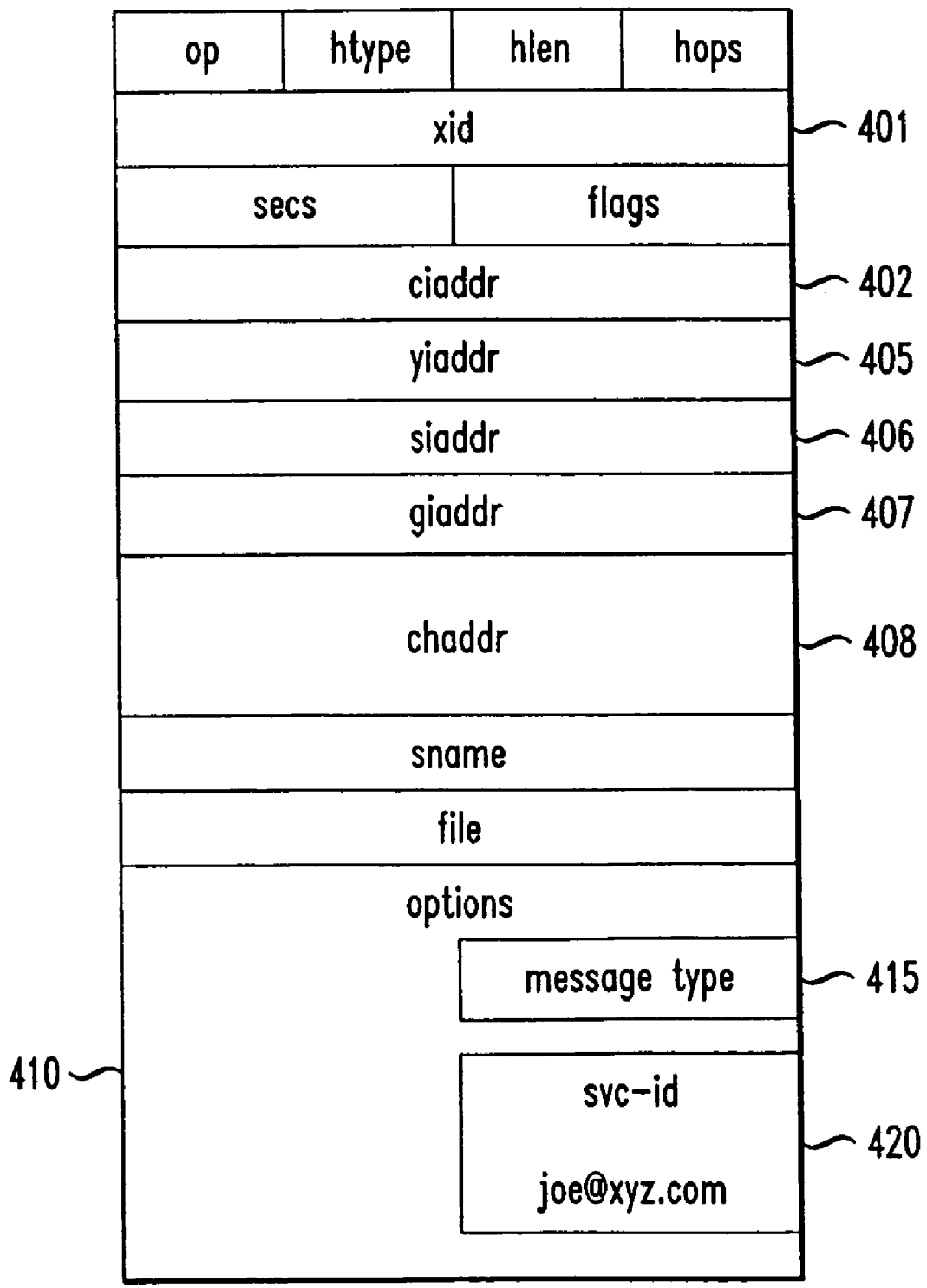
FIG. 4 is a conceptual representation of a DHCP message exchanged between the network access device and a DHCP server.

Referring now to FIG. 4, an exemplary format for a DHCP message is generally shown. The message comprises an xid field 401, ciaddr field 402, yiaddr field 405, siaddr field 406, giaddr field 407, chaddr field 408, and an options field 410 including a message type sub-field 415 and svc-id 420. Each DHCP message is characterized by type, such as DHCPDISCOVER, DHCPOFFER, DHCPREQUEST OR DHCPACK. The type of each DHCP message is encoded into options field 410. Each DHCP message 400 is set to indicate whether it is being communicated from a client 101 or the DHCP server (part of the network administration system) 121. The message identification is implemented by setting the op field to BOOTREQUEST or BOOTREPLY, to respectively indicate the origin of the message. The IP address is contained in the yiaddr field 405. The chadddr field 408 contains the MAC address of the client 101.

Figure 5:
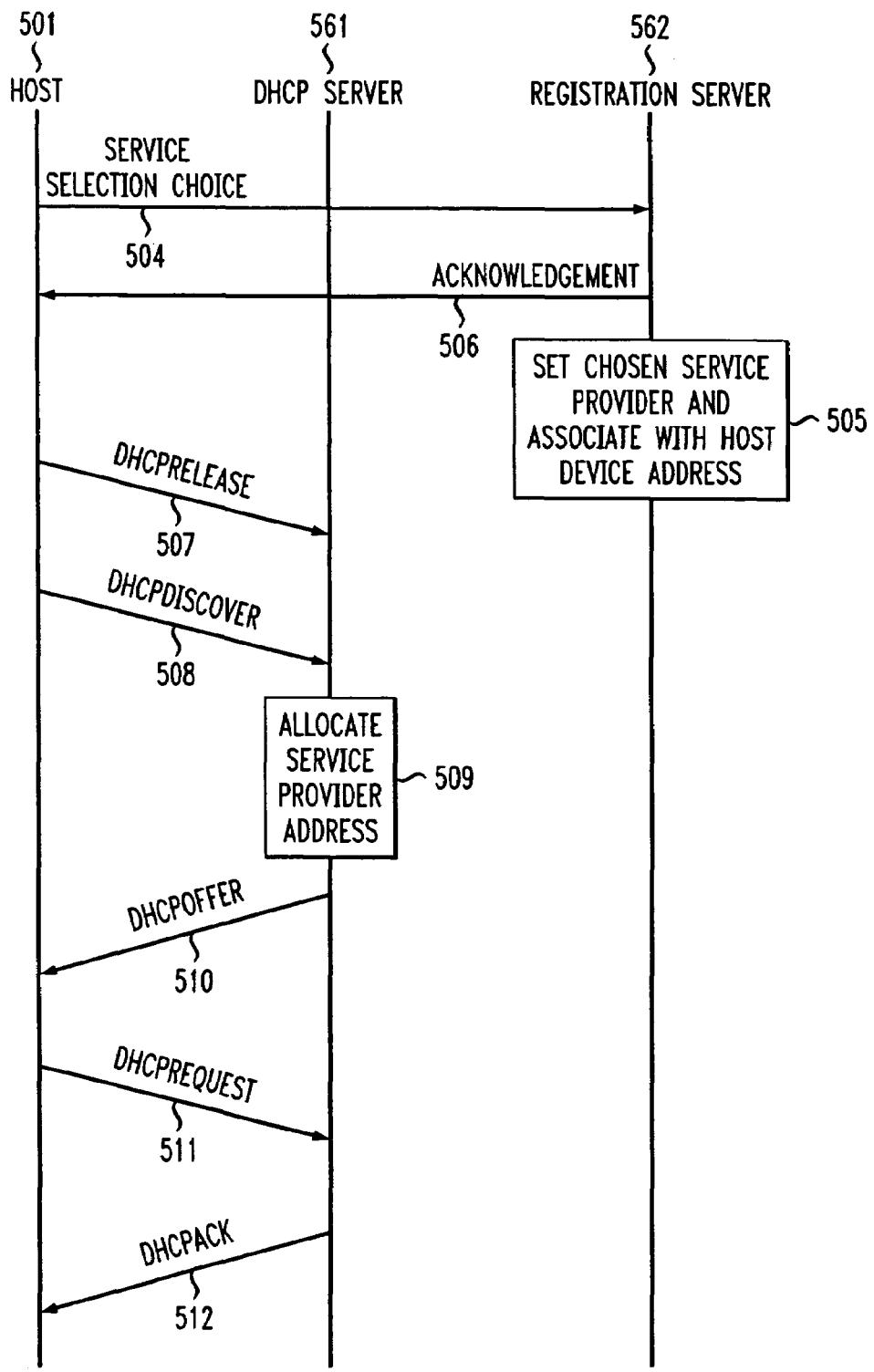
FIG. 5 is a timeline diagram of messages exchanged in the assignment of a network address associated with a particular service to a network access device, in accordance with a preferred embodiment of another aspect of the invention.

Referring now to FIG. 5, there is shown an embodiment where the subscriber registers the service selection with the registration server which temporarily establishes the association between the network access device's hardware address (e.g. the MAC address of the device) and the chosen service selection. The configuration server then uses the MAC address of the network access device to assign an IP address from the proper address space. FIG. 5 is a simplified timeline diagram of DHCP messages exchanged, in accordance with such an embodiment. As shown, the network access device 501 registers a service selection with the registration server 562. The client 501 sends a "SET ISP" message to the registration server 562. It is assumed that the subscriber has passed the proper authentication procedures for the particular service selected, either beforehand (e.g. through transactions directly with the service provider's network) or in the same session with the registration server. At 505 the registration server 562 stores the selected service and associates the service selection with the hardware device address (MAC address) of the network access device 501. It is advantageous for the DHCP server 561 to set a client class to the selected service provider with an "AUTHENTICATE-UNTIL" option set for example to 10 minutes, to prevent automatic renewal of the service provider's IP address in the future without a subsequent "heartbeat" message from the client. The registration server 562 sends an acknowledgment 506 to the network access device 501. After receiving the acknowledgment from the registration server 562, the network access device 501 releases any pre-existing address assignment by issuing a DHCPRELEASE message at 507. At 508, the network access device issues a standard DHCP-DISCOVER message. The DHCP server 561 receives the DHCPDISCOVER message and, at 509, allocates an IP address from the pool of address associated with the particular service associated with the device's MAC address.

The DHCP server 561 should check to see whether the current client set to ISP "AUTHENTICATE-UNTIL" has not expired. At 510, the DHCP server 561 sends a DHCPOFFER message that includes the IP address in a field in the DHCP message. At 511, the network access device 501 receives the DHCPOFFER and sends out a DHCPREQUEST back to the DHCP server 561. At 512, the DHCP server 561 commits to assigning the IP address to the network access device 501, commits the binding to persistent storage, and transmits a DHCPACK message containing the configuration parameters for the device. If the DHCP server is unable to satisfy the DHCPREQUEST message, the server responds with a DHCPNAK message.

The subscriber may subsequently change from the selected extra-regional network to a second extra-regional network, or to access only the regional access network. Although access to the regional access network is inherent according to the present invention with access to an extra-regional service network, it may be desirable to log-off the extra-regional service network and maintain only regional access. Accordingly, the process shown in FIG. 5 starts again, when the network access device 501 registers a different service selection with the registration server 562. The client 501 sends a "SET ISP" message to the registration server 562, which may be used as a "keep alive" or "heartbeat" message as discussed below with reference to FIG. 8. At 505 the registration server 562 stores the newly selected service and associates the service selection with the hardware device address (MAC address) of the network access device 501. The registration server 562 sends an acknowledgment 506 to the network access device 501. After receiving the acknowledgment from the registration server 562, the network access device 501 releases the pre-existing address assigned to the extra-regional network provider by issuing a DHCPRELEASE message at 507. At 508, the network access device issues a standard DHCPDISCOVER message. The DHCP server 561 receives the DHCPDISCOVER message and, at 509, allocates an IP address from the pool of address associated with the particular service associated with the device's MAC address, such as the regional access network provider or a second extra-regional network provider. The DHCP server 561 should check to see whether the current client set to ISP "AUTHENTICATE-UNTIL" has not expired. At 510, the DHCP server 561 sends a DHCPOFFER message that includes the IP address in a field in the DHCP message. At 511, the network access device 501 receives the DHCPOFFER and sends out a DHCPREQUEST back to the DHCP server 561. At 512, the DHCP server 561 commits to assigning the IP address to the network access device 501, commits the binding to persistent storage such as the database 163, and transmits a DHCPACK message containing the configuration parameters for the device for access to the regional access network or another extra-regional service network.

It is preferable that the DHCP servers and clients use some mutual authentication mechanism to restrict address assignment to authorized hosts and to prevent clients from accepting addresses from invalid DHCP servers. For example, the "delayed authentication" scheme described in R. Droms, W. Arbaugh, "Authentication for DHCP Messages," IETF Network Working Group, Internet Draft, <draft-ietf-dhc-authentication-_.txt>; or the Kerberos-based authentication mechanism described in K. Hornstein, T. Lemon, B. Aboba, J. Trostle, "DHCP Authentication via Kerberos V," IETF Network Working Group, Internet Draft, <draft-hornstein-dhc-kerbauth-_>; which are incorporated by reference herein. The "delayed authentication" mechanism supports mutual authentication of DHCP clients and servers based on a shared secret, which may be provisioned using out-of-band mechanisms. On the other hand, the Kerberos-based mechanisms are very well suited for inter-realm authentication, thereby supporting client mobility, i.e. a network access device could connect to a particular regional access network infrastructure without any prior registration with the regional access network. Each extra-regional service network provider could securely authenticate the network access device accessing the service network from another network "realm," e.g. the regional access network infrastructure.

The operator of the relevant service network, e.g. extra-regional service network 152 in FIG. 1, may desire to maintain a separate registration server, e.g. server 155 in FIG. 1, and to retain responsibility for user authentication and authorization. The service activation system 160 can provide a proxy server configured to permit HTTP traffic only between local hosts and registration server 155 in extra-regional service network 152. The service provider operating extra-regional service network 152 would then be responsible for providing the appropriate registration information required for proper service selection to the service activation system 160. In this event, the service provider would also be responsible for notifying the service activation system 160 when service should be discontinued to the particular user. Alternatively, the DHCP server 161 in the service activation system 160 can interact with the registration server 155 using a back-end authentication protocol, e.g. the Remote Authentication Dial In User Service (RADIUS). See C. Rigney, A. Rubens, W. Simpson, S. Willens, "Remote Authentication Dial In User Service (RADIUS)," IETF Network Working Group, RFC 2058 (January 1997), which is incorporated by reference herein. The DHCP server can contain a RADIUS client and, thereby, leverage the large RADIUS embedded base used for dial access authentication.

Figure 6:
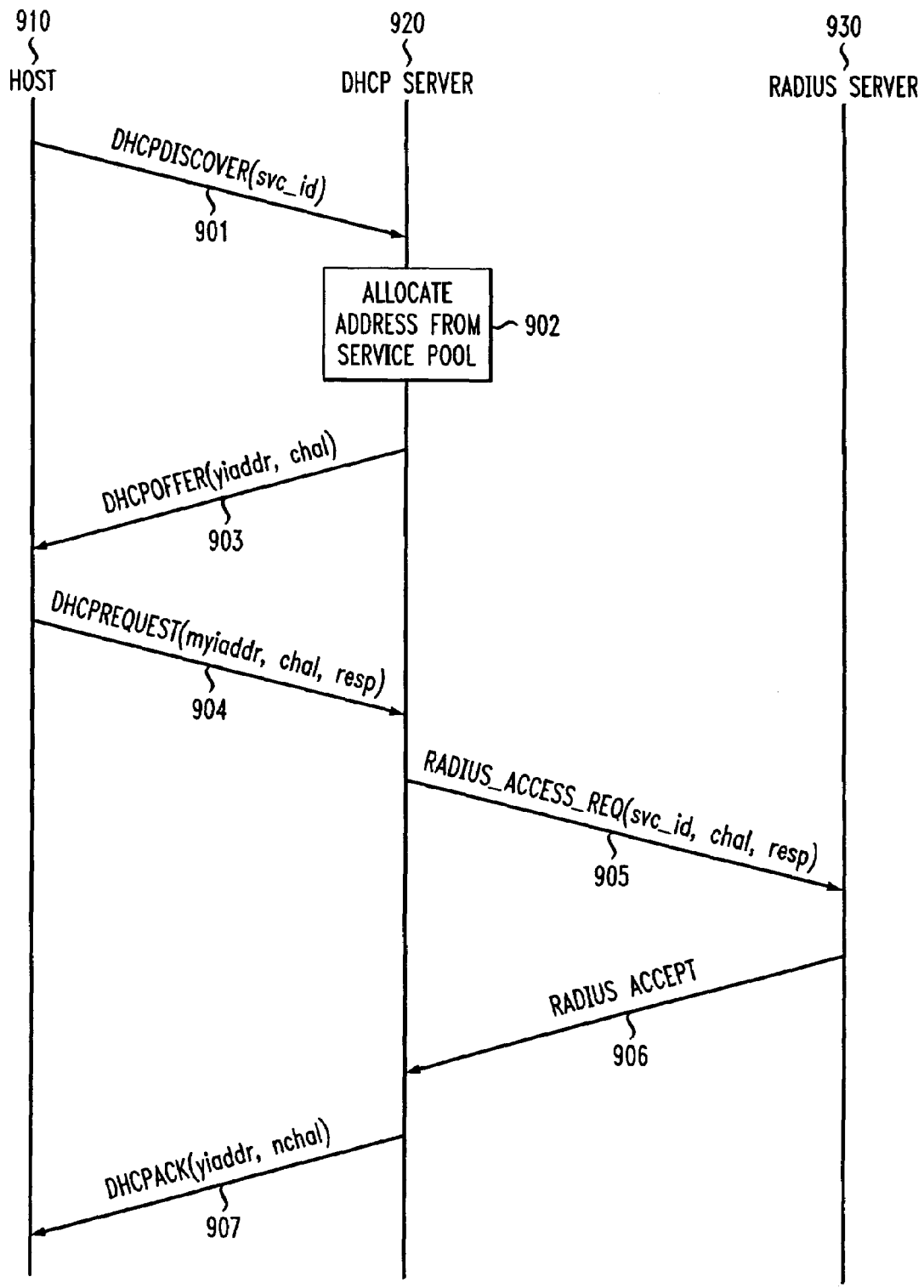
FIG. 6 is timeline diagram of messages exchanged in the assignment of an extra-regional network address associated with a particular service to a network access device, in accordance with a preferred embodiment of another aspect of the invention.
Figure 7:
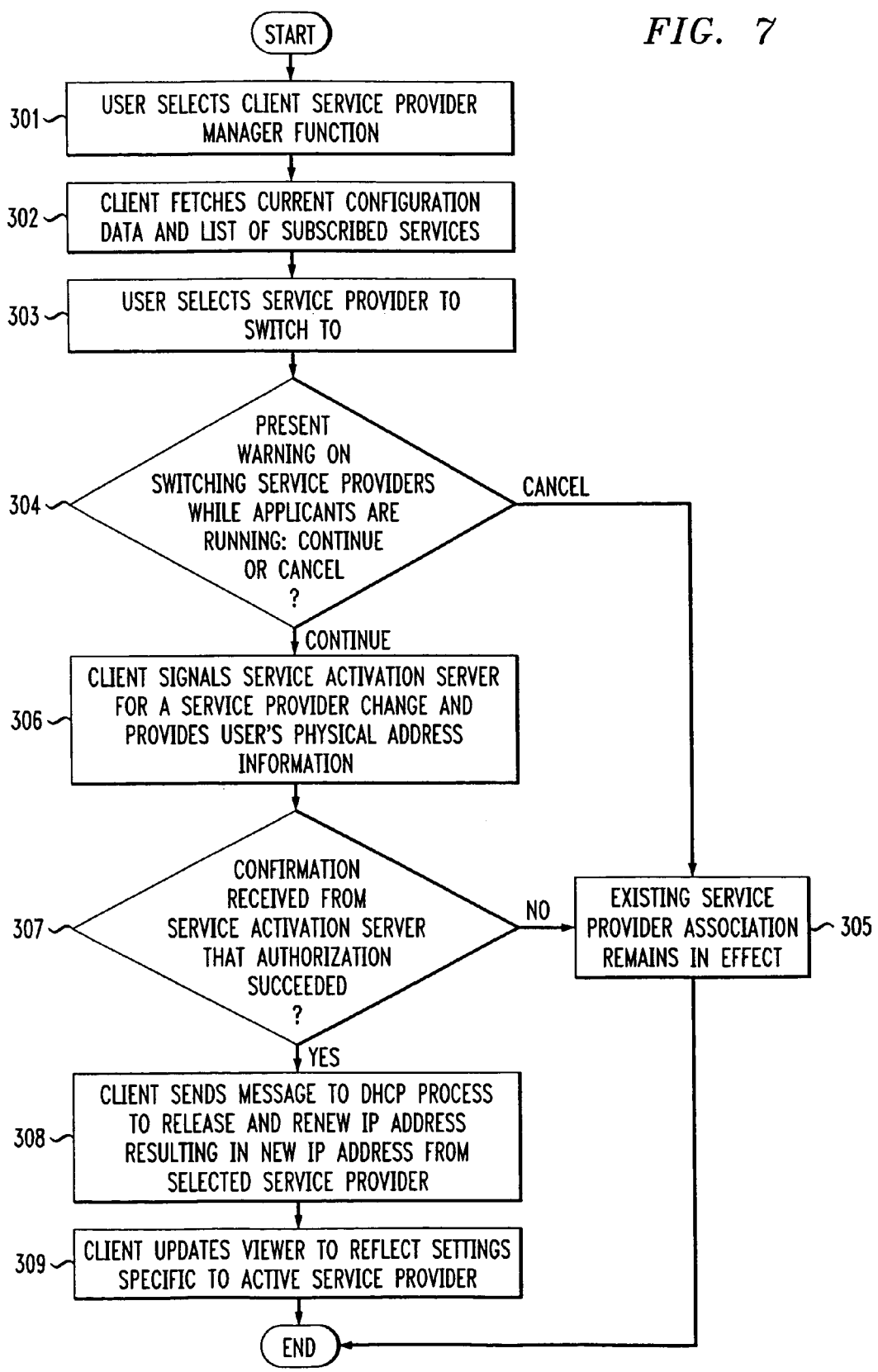
FIG. 7 is a flowchart of the actions of the service client in accordance with an embodiment of the invention.

FIG. 7 illustrates this embodiment of this aspect of the invention in a flowchart corresponding to the flowchart shown in FIG. 5. At 903, the DHCP server 920 generates a random challenge and includes the challenge along with the allocated IP address in the DHCPOFFER message. The DHCP client 910 generates a response to the challenge by encrypting the challenge with a key that is derived from the subscriber's authentication information. At 904, the client 910 includes the challenge, response, and IP address in the DHCPREQUEST message. The DHCP server 920 forwards both the challenge and response in a RADIUS_ACCESS_REQ message to a RADIUS server 930 in the selected service network. The RADIUS server 930 either accepts or rejects the RADIUS request and responds accordingly at 906. If the RADIUS request is accepted, the DHCP server 920 sends a DHCPACK message at 907 and the client 910 enters a bound state. If the RADIUS request is rejected, the DHCP server 920 sends a DHCPNACK message which informs the client 910 that the IP address that was allocated has been withdrawn. This is shown in FIG. 6. Alternatively, it is also possible to do RADIUS authentication without requiring modification of the DHCP protocol by passing authentication credentials from client to registration server in a separate message, having the registration server use RADIUS to authenticate with the service provider, then set or not set the client class in the DHCP server to allow the client to get an address from the service provider's range upon the next DHCP request.

FIG. 7 is a flowchart depicting the actions of the service client in accordance with an embodiment of the invention. The subscriber is logged into a profile with a working service provider's IP address, e.g., the address allocated to the user of the regional access service provider, r-svc (120). Within a current login session, the subscriber desires to change from the active service provider-r-svc (120) to another subscribed service provider, x-svc-1 (151). In accordance with a preferred embodiment of the present invention, the subscriber makes the request using the service provider manager function of the client, which will initiate a series of steps to effect a change in the IP address for network access device 101. At step 301, the user accesses the service provider manager function of the client shown generally at 720 in FIG. 3. As discussed above, the service provider manager function enables the user to select a service provider from a stored list of service providers in the client. In the illustrative embodiment, the user is currently using active service provider r-svc and desires to change to extra-regional service provider x-svc-1. At step 302, the client 101 fetches the current account configuration data from the service activation system 160 over the access network and checks whether the stored list of subscribed service providers is current. Any changes can be reconciled before displaying the selection of service providers to the user.

The service activation system 160 is described above and can utilize user credentials, either explicitly requested or cached automatically, to authorize the fetching of account configuration data. If the cached credentials on the client are invalid, the attempt to update the list of configured service providers may be refused and the user alerted that the credentials need to be updated. A specialized account restoration procedure can be utilized by a properly-authorized administrative user to update the cached credentials. Alternatively, the user may ignore the message and continue using the old list of configured service providers. These options may be displayed by the client software in a manner analogous to what is commonly utilized in a dial-up connection using text-based or graphical controls. At step 303, the user selects an option within the service provider manager function to switch to the new service provider (x-svc-1). If the extra-regional service provider is not configured, then the service provider manager function 720 of the client can offer to add the new service provider. The client can be configured to automatically connect to the service activation system 160 and enable the user to interact with a service provider management feature in the service activation system 160 as well as any necessary service provider-specific registration sites. After receiving the proper configuration data and any service provider access credentials, if required by the service provider, the client can return back to step 303 in FIG. 7. At step 304, the client displays a warning with respect to switching between service providers while network applications are running. The user can then choose to either continue or cancel the operation. If the user chooses to cancel, then, at step 305, the current service provider association remains in effect and the client service provider manager function ends.

If the user chooses to continue, the client signals the service activation system 160 at step 306 for a service provider change and may provide the access device's (111) physical address information, such as a MAC address as discussed above. The client will also send the subscribers credentials, in one exemplary embodiment, to enable the service activation system to authenticate the subscriber. The service activation system (registration server 162) will check the subscriber's credentials and credit information utilizing a network-based subscription/authorization process for the various services shared on the access network infrastructure. At step 307, the client receives confirmation from the service activation system 160 that the change to the new service provider is authorized. If the authorization fails, the service activation system 160 returns an error message to the client, the existing service provider association remains in effect, and the client service provider manager function ends. If authorization to switch to the new service provider has succeeded, at step 308, the client sends a message to a local DHCP process (controlled by network application software in the client or on a networked system) requesting that it release and renew the IP address of the access device 101 in accordance with the methodology described above and illustrated in FIG. 5. In this manner, a new IP address is assigned to the access device from the selected service provider. At step 309, the client can update the browser interface 790 to reflect the settings specific to the active service provider (e.g., x-svc-1).

Figure 8:
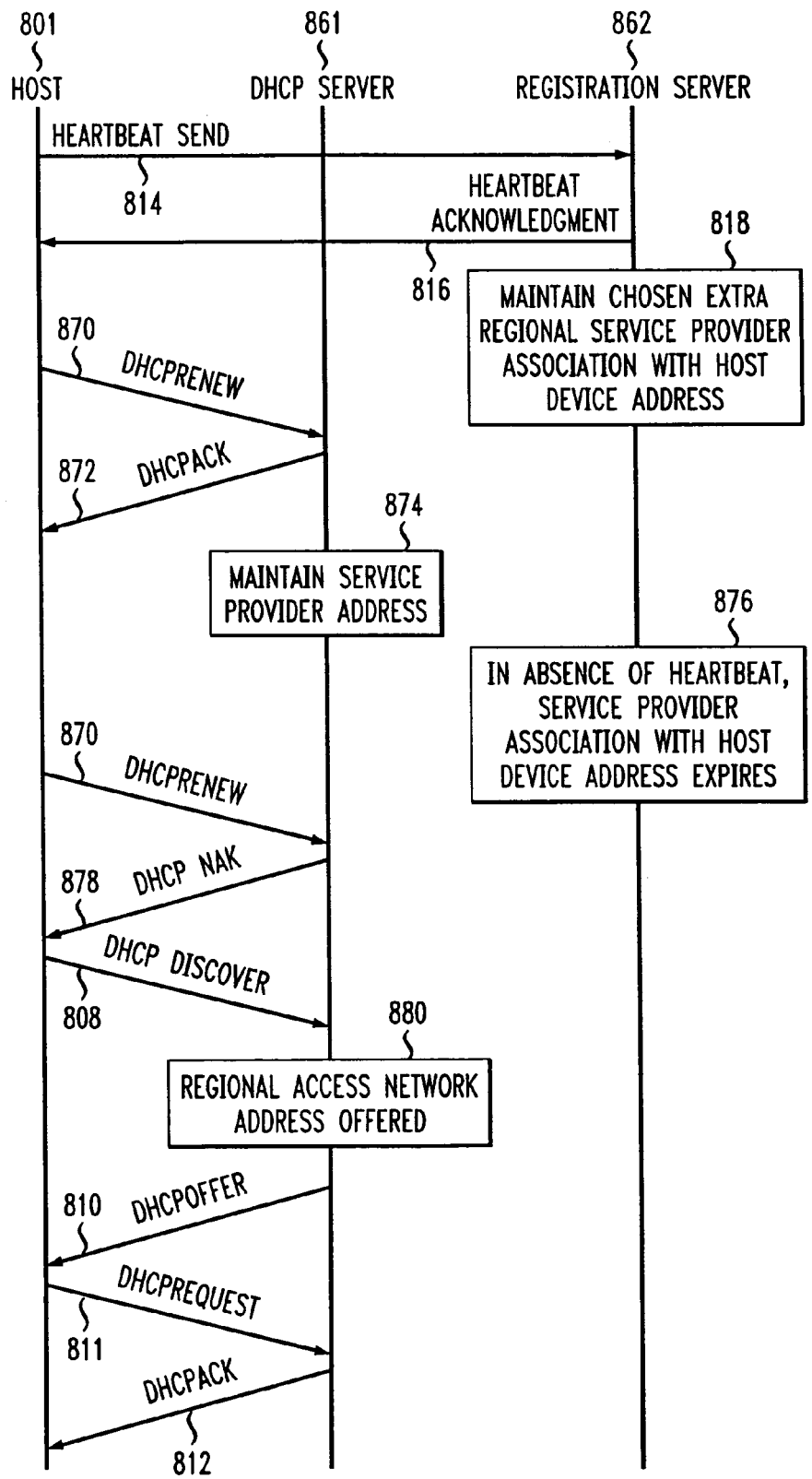
FIG. 8 is a timeline diagram of messages exchanged in the release of an extra-regional network address in relation to a heartbeat message, and the assigning of a new network address associated with the regional access network address, in accordance with a preferred embodiment of another aspect of the invention.

Referring now to FIG. 8, there is shown an embodiment where lack of client persistence provides a default change of access from an extra-regional service network to a regional access network. This embodiment takes advantage of the "Authenticate-Until" function on the DHCP server, which causes the DHCP server to not allow a renewal of an IP address from a service provider unless the client has recently sent a "keep-alive" or "heartbeat message"; thereby enforcing client persistence. If the network access device attempts to renew the lease without the persistent client first having sent a heartbeat message, the request is denied and the device reverts to its regional access network address.

As part of maintaining an address assigned to the client, a DHCPRENEW message is sent automatically by the client to the DHCP server to renew the network address lease prior to expiration of the lease period. The lease period is the time period that the network address is assigned to the network address device, whereas the "AUTHENTICATE-UNTIL" period is the time period pre-set by the access network in which the client has to send a DHCP RENEW request after having sent a "heartbeat message" to the registration server. The authenticate-until period should be less than the lease period.

Referring now to FIGS. 5 and 8, as discussed with reference to FIG. 5 above, the client may access an extra-regional service network through the access network when the network access device is assigned a network address associated with the extra-regional service provider. As part of the address assignment process discussed with reference to FIG. 5, it is advantageous for the DHCP server 561 to set a client class to the selected extra-regional service provider with an "AUTHENTICATE-UNTIL" option set, for example, to 10 minutes. As with receipt of a DHCPDISCOVER message, when the DHCP server receives a DHCPRENEW, it leases or renews the address lease based on information contained in the database 163 maintained by the registration server. If the current client's ISP "AUTHENTICATE-UNTIL" has not expired, the registration server will not have modified the database to indicate a different lease address option for the client (e.g. the database will show the current address as being available for the network access device), and the DHCP server will therefore renew the lease. In this embodiment, if the DHCP RENEW is not received by the DHCP server within the 10 minute period after the heartbeat was sent to the registration server, the "AUTHENTICATE-UNTIL" period will expire, and the DHCP server will return a DHCP NAK in response to a DHCPRENEW request from the client.

As shown in FIG. 8, the host or client 801 sends 814 a heartbeat message, which is preferably in the form of a "SET ISP" message requesting maintenance of the current address, to the registration server prior to the time the DHCP client would normally attempt to renew the lease (generally when half of the lease period has expired). The registration server 862 returns a heartbeat acknowledgement message 816 to the client, and sets the "authenticate-until" period (e.g. a new 10 minute period) in the database 163. Prior to expiration of the authenticate-until period, the client sends a DHCP RENEW message 870 to the DHCP server 861 requesting renewal of the lease. The DHCP server 861 authenticates the request with the database 163 maintained by the registration server 862, based on the client having sent the latest heartbeat message within the pre-set time period. As such, the DHCP server sends a DHCPACK message 872 to the client, thereby renewing and maintaining the extra-regional network address lease.

If the client does not send the DHCP RENEW prior to the pre-set time period, the "authenticate-until" will expire 876. If the software resident on the client that is responsible for returning the heartbeat message is disabled, interrupted, or simply turned-off by the subscriber, then the client will be logged-off the extra-regional network by default. Accordingly, the next time the client sends a DHCP RENEW message 870 to the DHCP server 861, the DHCP server will return a DHCP NAK message 878 to the client, because the registration server will not have authenticated the lease renewal. Upon receipt of the DHCP NAK message, the client will re-initialize and broadcast a DHCP Discover message 808 on the regional access network. In response, the process will begin again and the DHCP server will offer 880 a network address associated with the regional access network, such as a private address of the type beginning with 10, unless the registration server updates the database 163 with information that the client is authorized for requested access to an extra-regional service network. According to this embodiment, the registration server will not update the database 163 to reflect access to an extra-regional service network until the persistent client software is operational on the network access device, as indicated by the registration server receiving heartbeat messages therefrom.

As a result, this embodiment provides for the default changing of service access from extra-regional service network access, to regional access network access. Additionally, it allows the access network to require the persistent client software to remain operational on the network access device, which software may perform other functions beneficial to the regional access network. Additionally, according to this embodiment, extra-regional network access is not being wasted by a disabled or a non-operational network access device. Although the sending of the heartbeat message itself may be a burden on the regional access network, the access network can extend the lease renewal time period according to system resources, thus increasing the time needed between heartbeats. The persistent client software can tell from the network access device at what time the DHCP RENEW message will be sent, and send the heartbeat shortly before that time.

The present invention has been shown in what are considered to be the most preferred and practical embodiments. It is anticipated, however, that departures may be made therefrom and that obvious modifications may be implemented by persons skilled in the art.

From the foregoing detailed description, it will be evident that there are a number of changes, adaptations, and modifications of the present invention that come within the province of those skilled in the art. However, it is intended that all such variations not departing from the spirit of the invention be considered as within the scope thereof as limited solely by the claims appended hereto.

We claim:

1. A method of configuring a network access device associated with a subscriber of network services of a regional access network and having a network address associated with an extra-regional service network, with a new network address associated with the regional access network, wherein the network access device is connected to the regional access network by a cable modem and the regional access network is connected to a plurality of extra-regional service networks, the method comprising:
   receiving from the network access device, a first request for access to the extra-regional service network;
   assigning, to the network access device in response to the first request, a first network address allocated to subscribers of the extra-regional service network, the first network address used by the network access device to communicate over the regional access network to the extra-regional service network;
   receiving from the network access device, a second request at the regional access network requesting the release of access to the extra-regional service provider;
   sending, to the network access device, a response to the second request from the regional access network;
   receiving, from the network access device, a network address change request using a configuration protocol, and
   assigning to the network access device, a second network address allocated to subscribers of the regional access network, the second network address used by the network access device to communicate data packets with the regional access network.

2. The method of claim 1, wherein the configuration protocol is a dynamic host configuration protocol (DHCP).

3. The method of claim 1, wherein the network access device is assigned an Internet Protocol address.

4. The method of claim 3, wherein the Internet Protocol address is a private address.

5. The method of claim 4, wherein the private address is a binary address having a dotted-decimal equivalent of the type beginning with the number 10.

6. A method of configuring a network access device associated to a subscriber of network services of a regional access network and having a network address associated with a regional access network, with a new network address associated with an extra-regional service network, wherein the network access device is connected to the regional access network by a cable modem and the regional access network is connected to a plurality of extra-regional service networks, the method comprising:
   receiving, from the network access device, a first request for access to the regional access network;
   assigning, to the network access device in response to the first request, a first network address allocated to subscribers of the regional access network, the first network address used by the network access device to communicate to the regional access network;
   receiving, from the network access device, a second request to access an extra-regional service network, wherein the request includes an authentication request for the subscriber;
   sending, to the network access device, a response to the second request from the regional access network, wherein the response includes an authentication status for the subscriber; and
   when the subscriber is authenticated, receiving, from the network access device a network address change request using a configuration protocol, and
   assigning, to the network access device, a second network address allocated to subscribers of the extra-regional service provider, the second network address used by the network access device to communicate data packets to the extra-regional service network.

7. The method of claim 6, wherein the configuration protocol is a dynamic host configuration protocol (DHCP).

8. The method of claim 6, wherein the network access device is assigned an Internet Protocol address.

9. A method of configuring a network access device, the device being associated to a subscriber of network services and having a network address associated with a regional access network, with a new network address associated with an extra-regional service network, wherein the network access device is connected to the regional access network by a cable modem and the regional access network is connected to a plurality of extra-regional service networks, and the access network is in communication with a service activation system, the method comprising:
   receiving, from the network access device, a first request for access to the regional access network;
   assigning, to the network access device in response to the first request, a first network address allocated to subscribers of the regional access network, the first network address used by the network access device to communicate to the regional access network;
   receiving from the network access device, a second request to access an extra-regional service network, wherein the request includes an authentication request for the subscriber;
   receiving authentication information for the extra-regional service provider at the service activation system over the regional access network;
   sending an authentication status of the subscriber from the service activation system and, when the subscriber is authenticated;
   receiving, from the network access device, a network address change request using a configuration protocol, and
   assigning, to the network access device, a second network address associated with the extra-regional service provider is assigned to the network access device, the network address being utilized by the network access device to communicate data packets with the extra-regional service network.

10. The method of claim 9, wherein the configuration protocol is a dynamic host configuration protocol (DHCP).

11. The method of claim 9, wherein the network access device is assigned an Internet Protocol address.

12. A method of configuring a network access device of a subscriber of network services of a regional access network and having a network address associated with extra-regional service network, with a new network address allocated to subscribers of the regional access network, wherein the network access device is connected to the regional access network by a cable modem and the regional access network is connected to a plurality of extra-regional service networks, and the access network is in communication with a service activation system having a pre-set authentication period for receiving keep-alive messages from the network access device, the method comprising:
   receiving, from the network access device, a first request for access to the regional access network;

assigning, to the network access device in response to the first request, a first network address allocated to subscribers of the regional access network, the first network address used by the network access device to communicate to the regional access network;

receiving, from the network access device, a second request to access an extra-regional service network, wherein the request includes an authentication request for the subscriber;

sending, to the network access device, a response to the second request from the regional access network, wherein the response includes an authentication status for the subscriber;

when the subscriber is authenticated, receiving, from the network access device, a network address change request using a configuration protocol;

assigning, to the network access device, a second network address allocated to subscribers of the extra-regional service provider, the second network address used by the network access device to communicate data packets to the extra-regional service network, the second network address having an authentication period;

failing to receive a keep-alive message from the network access device prior to expiration of the authentication period;

failing to renew a lease for the second network address associated with the extra-regional network service provider; and assigning new network address using the configuration protocol, the new network access address for communicating data packets with the regional access network.

13. The method of claim 12, further comprising extending the lease of the network service address responsive to receiving periodic keep-alive messages.

14. The method of claim 12, further comprising extending the preset authentication period responsive to a pre-determined level of data traffic flow through the access network.

15. The method of claim 12, wherein the configuration protocol is a dynamic host configuration protocol (DHCP).

16. The method of claim 12, wherein the network access device receives an Internet Protocol address.

17. The method of claim 16, wherein the Internet Protocol address is a private address.

18. The method of claim 17, wherein the private address is a binary address having a dotted-decimal equivalent of the type beginning with the number 10.

19. The method of claim 12, wherein the network access device is connected to a computer-readable medium having computer-executable instructions for sending the keep-alive message, and said failing to receive the keep-alive message includes interfering with execution of the computer-readable instructions.

20. The method of claim 19, wherein said interfering includes interrupting execution of the computer-readable instructions.

21. The method of claim 19, wherein said interfering includes terminating execution of the computer-readable instructions.

22. The method of claim 19, wherein said interfering includes disabling operation of the network access device.

23. A computer-readable medium having computer-executable instructions for enabling a regional access network to perform a method of allocating network addresses to a network address device having a cable modem, the method comprising:

receiving, from the network access device of a subscriber of the regional access network, a first request to access the regional access network;

assigning, to the network access device in response to the first request, a first network address allocated to subscribers of the regional access network, the first network address used by the network access device to communicate to the regional access network;

receiving, from the network access device, a second request to access an extra-regional service network connected to the regional access network, wherein the request includes an authentication request for the subscriber;

sending, to the network access device, a response to the second request from the regional access network, wherein the response includes an authentication status for the subscriber;

when the subscriber is authenticated, receiving, from the network access device, a network address change request using a configuration protocol;

assigning, to the network access device, a second network address allocated to subscribers of the extra regional service provider, the second network address used by the network access device to communicate data packets to the extra-regional service network, the second network address having an authentication period; and receiving, from the network access device, a keep-alive message for extending authentication of the second network address.

24. The computer-readable medium of claim 23, the method further comprising:

accepting a subscriber request to log-off the extra-regional service network; and sending a request to the regional access network requesting release of a lease for the second network address associated with the extra-regional service network.

* * * * *